US009540272B2

(12) United States Patent
Bookbinder et al.

(10) Patent No.: US 9,540,272 B2
(45) Date of Patent: Jan. 10, 2017

(54) BURNER SHIELD TO REDUCE SOOT BUILDUP

(71) Applicant: CORNING INCORPORATED, Corning, NY (US)

(72) Inventors: Dana Craig Bookbinder, Corning, NY (US); Brian Lee Harper, Wilmington, NC (US); Mothivel Balaiyya Mummudi-Boopathy, Painted Post, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 190 days.

(21) Appl. No.: 14/284,772

(22) Filed: May 22, 2014

(65) Prior Publication Data

US 2015/0336839 A1 Nov. 26, 2015

(51) Int. Cl.
*C03B 37/018* (2006.01)
*F23D 99/00* (2010.01)
*C03B 37/014* (2006.01)

(52) U.S. Cl.
CPC ..... *C03B 37/01815* (2013.01); *C03B 37/0142* (2013.01); *F23D 99/003* (2013.01); *C03B 2207/40* (2013.01); *Y02P 40/57* (2015.11)

(58) Field of Classification Search
None
See application file for complete search history.

(56) References Cited

U.S. PATENT DOCUMENTS 5,116,400 A * 5/1992 Abbott ............... C03B 37/0142
118/310
6,334,339 B1 * 1/2002 Kanao ................. C03B 37/0142
239/422

(Continued)

FOREIGN PATENT DOCUMENTS

JP 57007834 A * 1/1982
JP 62162637 A * 7/1987

(Continued)

OTHER PUBLICATIONS

JP2006-306652 Machine Translation Performed by JPO website Mar. 10, 2016.*

(Continued)

*Primary Examiner* — Lisa Herring
(74) *Attorney, Agent, or Firm* — Robert L. Carlson (57) ABSTRACT

A soot deposition burner assembly, having at least one burner including a burner face on a first surface of a burner support. The burner produces a flame which extends generally perpendicularly to the first surface. A burner shield includes a first wall extending generally perpendicularly from the first surface surrounding the burner face. The burner shield has a base end with a first surface area facing toward the first surface and a shield face with a second surface area facing away from the first surface. To reduce the buildup of soot material, the second surface area is smaller than the first surface area, and the wall thickness is less at the shield face than the base end. Additionally, air can be directed along an exterior surface of the first wall from the base end toward the shield face to further reduce soot buildup.

16 Claims, 8 Drawing Sheets

(56) References Cited

U.S. PATENT DOCUMENTS

2003/0029202 A1\* 2/2003 Ooishi .............. C03B 37/01406
65/384
2009/0293545 A1\* 12/2009 Groh .................. C03B 19/1423
65/17.4

FOREIGN PATENT DOCUMENTS

| JP | 04193730 | 7/1992 |
| JP | 04228443 | 8/1992 |
| JP | 09100133 | 4/1997 |
| JP | 2006306652 | 11/2006 |
| WO | 01/17918 | 3/2001 |

OTHER PUBLICATIONS

International Search Report, issued in connection with corresponding PCT application No. PCT/US2015/031719, Aug. 10, 2015.

\* cited by examiner

BURNER SHIELD TO REDUCE SOOT BUILDUP

BACKGROUND

The present disclosure generally relates to a burner shield to reduce soot buildup during operation of a soot depositing burner assembly.

SUMMARY

According to one aspect of the present disclosure, a burner shield for a soot deposition burner includes a generally cylindrical first wall which is disposed radially outwardly from the soot deposition burner. The first wall includes an interior surface which extends from a base end to a shield face. The first wall has a first thickness adjacent to the base end and a second thickness adjacent to the shield face, and the second thickness is less than the first thickness.

Another aspect of the present disclosure includes a soot deposition burner assembly, having at least one soot deposition burner including a burner face on a first surface of a burner support. The soot deposition burner produces a flame which extends generally perpendicularly to the burner face. A burner shield includes a first wall extending generally perpendicularly from the first surface surrounding the burner face. The burner shield has a base end with a first surface area facing toward the first surface of the burner support and a shield face with a second surface area facing away from the first surface of the burner support. The second surface area is smaller than the first surface area.

Another aspect of the present disclosure includes a burner shield for a soot deposition burner disposed on a first surface of a burner support, where the burner shield includes a generally cylindrical first wall disposed radially outwardly from the soot deposition burner, and generally cylindrical second wall disposed radially outwardly from the first wall. An annular space is defined between the first wall and the second wall, and a gas flow is permitted to flow through the annular space in a direction generally perpendicular to and outward from the first surface of the burner support.

Yet another aspect of the present disclosure includes a method of making a preform for an optical fiber, including the steps of operating a burner assembly to produce a flame, wherein the burner assembly includes a burner face disposed on a first surface of a burner support, and wherein the flame extends generally perpendicularly from the first surface. The flame is guided with a burner shield, wherein the burner shield includes a generally cylindrical first wall which is disposed radially outwardly from the burner face, and the first wall includes an interior surface surrounding the flame and extends from a base end to a shield face. The first wall has a first thickness adjacent to the base end and a second thickness adjacent to the shield face, and the second thickness is less than the first thickness. Precursors for the production of a soot material are supplied to the flame. The precursors are reacted in the flame to form the soot material. The formed soot material is deposited onto a rotating bait rod positioned generally perpendicularly to the flame.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts. For purposes of description herein the terms "upper," "lower," "right," "left," "rear," "front," "vertical," "horizontal," and derivatives thereof shall relate to the device as oriented in FIG. 3. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
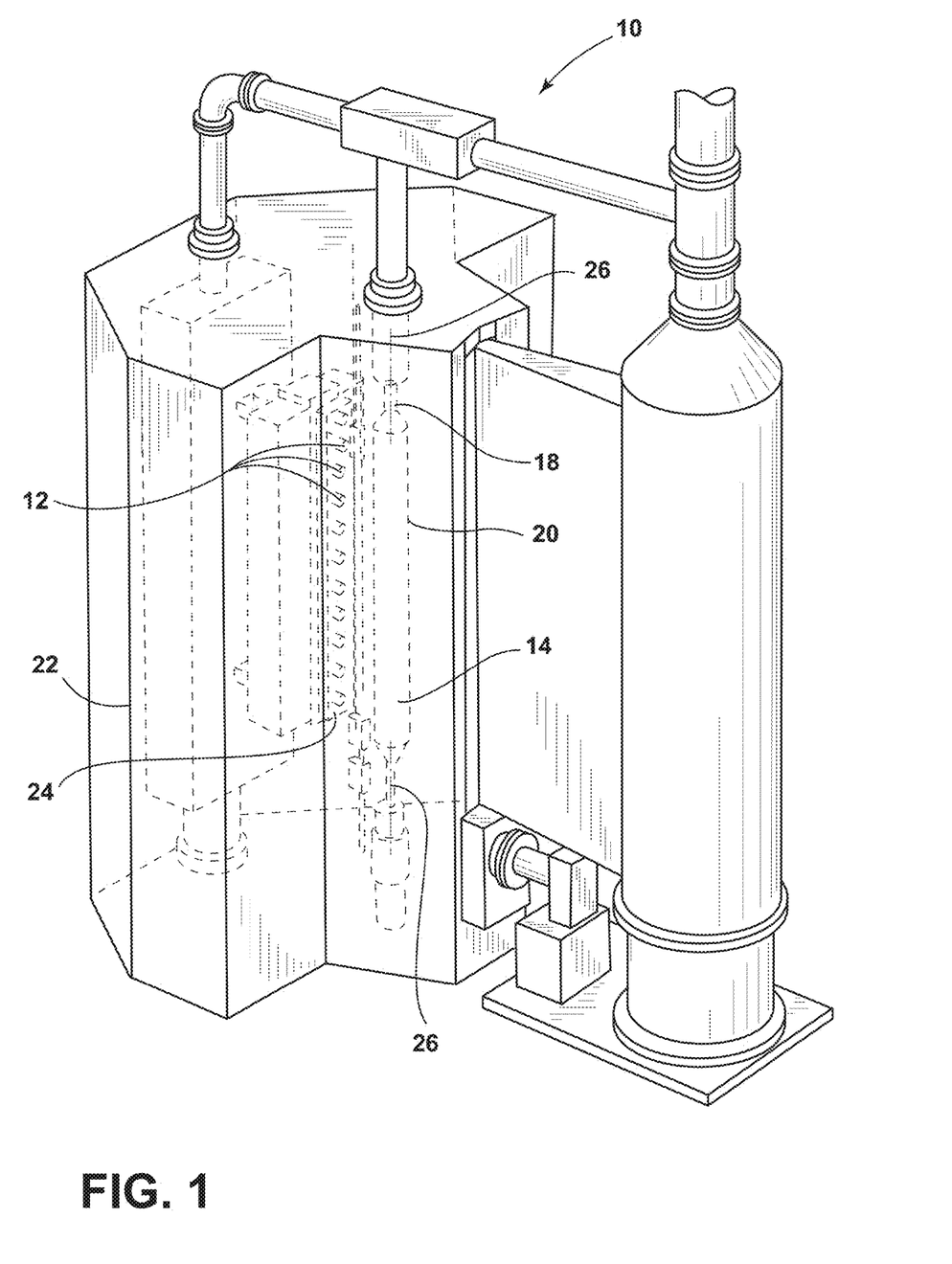
FIG. 1 is a top perspective view of one embodiment of a lathe for soot deposition according to the present disclosure.
Figure 3:
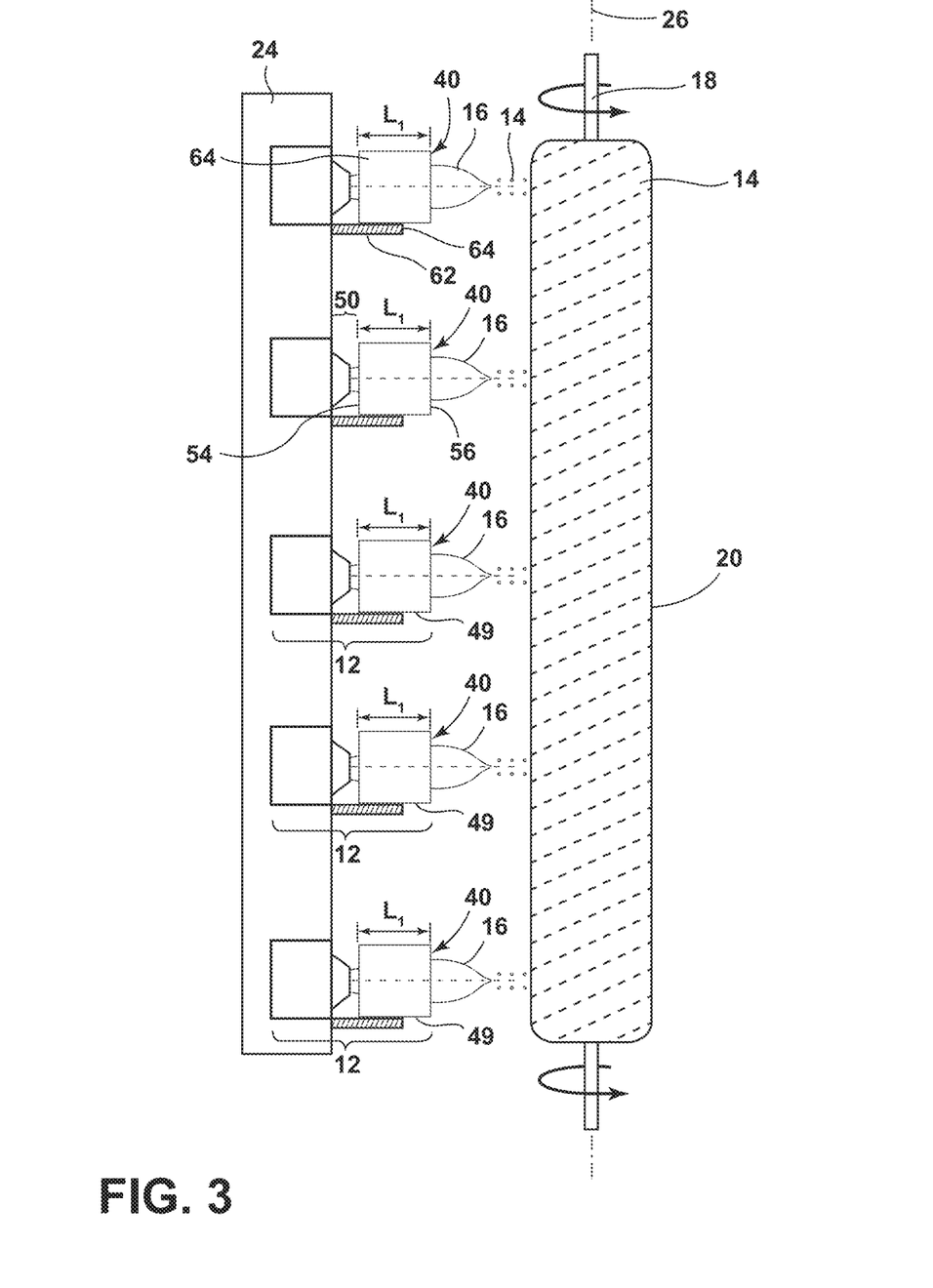
FIG. 3 is a side elevation view of a burner support with a plurality of burner assemblies according to the present disclosure thereon, and a preform onto which the burner assemblies deposit a soot material.
Figure 4:
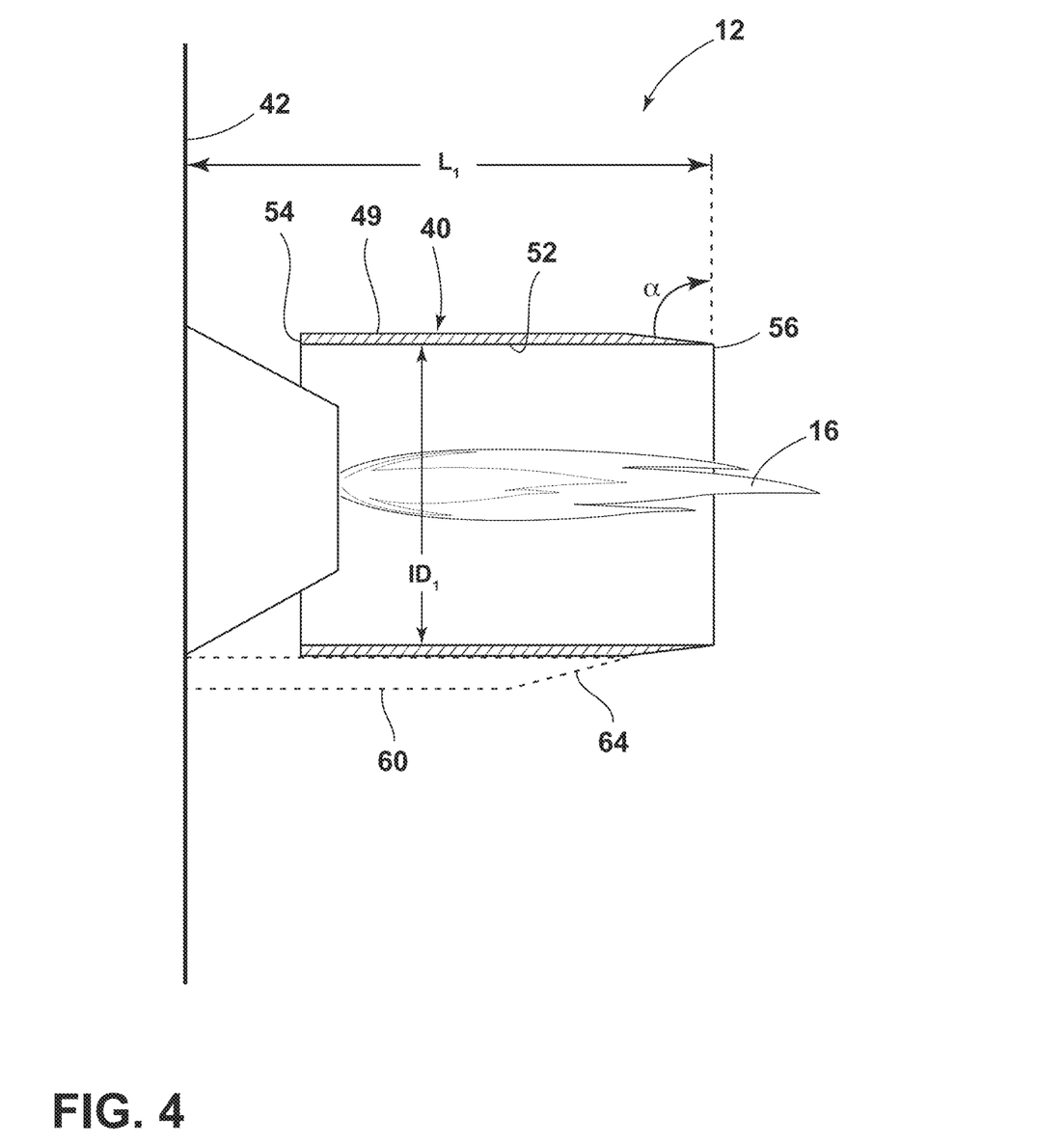
FIG. 4 is an enlarged side elevation view of one of the burner assemblies shown in FIG. 3, with the burner shield shown in cross section.

FIG. 1 generally depicts a lathe 10 with soot depositing burner assemblies 12 for pyrogenically generating soot material 14 in a soot depositing flame 16, and depositing the soot material 14 on a bait rod 18 to form porous glass optical fiber preforms 20 as shown in FIGS. 3 and 4. The disclosure is applicable to preforms 20 for producing both single mode and multimode optical fibers. The soot depositing burner assemblies 12 disclosed herein can be used to create optical fiber cores or cladding, and their use results in optical fiber preforms 20 which can be consolidated and drawn into optical fibers with a reduced occurrence of flaws in the resulting optical fibers.

In overview, the embodiment of the lathe 10 shown in FIG. 1 includes a housing 22 enclosing a vertically-oriented burner support 24 with a plurality of the soot depositing burner assemblies 12 thereon, and the rotating bait rod 18 positioned parallel to the burner support 24. The burner assemblies 12 are preferably equidistantly spaced along the burner support 24, and are configured to direct the soot depositing flames 16 toward the bait rod 18, as further described below. The bait rod 18 is rotated about its longitudinal axis 26 by means of a motor (not shown) during soot laydown. In operation, the soot depositing burners are used to deposit the porous soot material 14 evenly around the circumference of the bait rod 18 as the bait rod 18 is rotated, thus forming the porous soot preform 20 around the bait rod 18.

Figure 2:
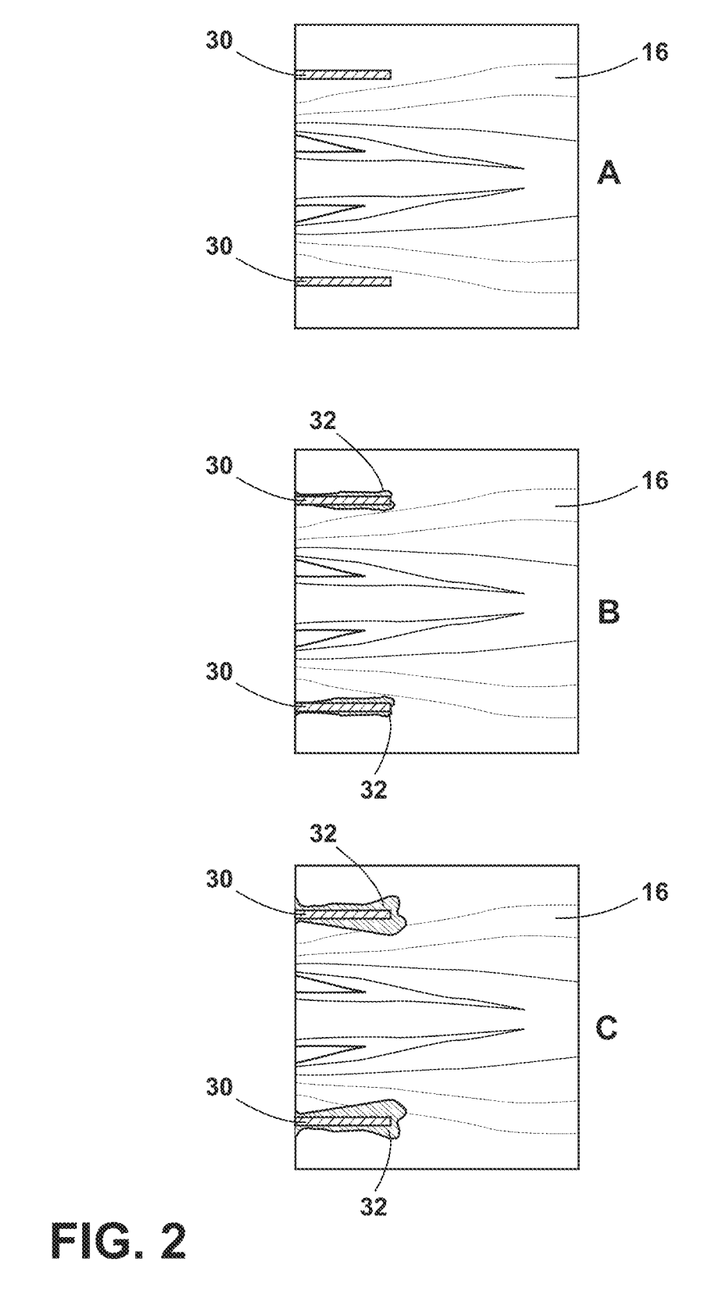
FIG. 2A is a cross sectional view of a prior art burner shield for use on a soot depositing burner assembly upon a startup of operation of the burner assembly.
FIG. 2B is a cross sectional view of the burner shield shown in FIG. 2A after operation of the burner assembly for 20 minutes.
FIG. 2C is a cross sectional view of the burner shield shown in FIG. 2A after operation of the burner assembly for 30 minutes.

Prior art burner shields 30 such as those shown in cross-sectional view in FIGS. 2A-C have been used to direct the flame 16 in the desired direction and to prevent the flame 16 from being disturbed by air circulating in the housing 22. The burner shield 30 provides the advantage of keeping the flame 16 stable and focused on the bait rod 18 (and preform 20, as it is formed). The burner shield 30 also increases the capture efficiency and uniformity of soot deposited on the preform 20 by the soot depositing flame 16 generated by the burner assembly 12. However, one of the drawbacks associated with burner shields 30 include the deposition of soot on the burner shields 30, which can aggregate on the burner shields 30 to form lobes 32 of porous soot material 14 over time, as shown in FIGS. 2A-2C, which depict cross sectional views of the burner shield 30 taken at various times during the operation of the burner assembly 12. FIG. 2A depicts a cross sectional view of the burner shield 30 upon initiation of the burner assembly 12. FIG. 2B depicts the cross sectional view of the burner shield 30 after 20 minutes of operation, and FIG. 2C depicts the cross sectional view of the burner shield 30 after 30 minutes of operation, at which time the lobes 32 of soot material 14 have collected around the burner shield 30. These lobes 32 can detach from the burner shield 30 during operation and contaminate the preform 20 with clumps of soot material 14, resulting in local non-uniformities of the soot material 14 on the preform 20, which result in defects such as seeds, warts, blisters, or voids in any optical fiber drawn from the preform 20.

The present disclosure includes the soot depositing burner assembly 12 with a burner shield 40 which provides the same advantages of previously used burner shields 30, while minimizing the drawback of soot buildup that can be dislodged to foul the preform 20.

Figure 5:
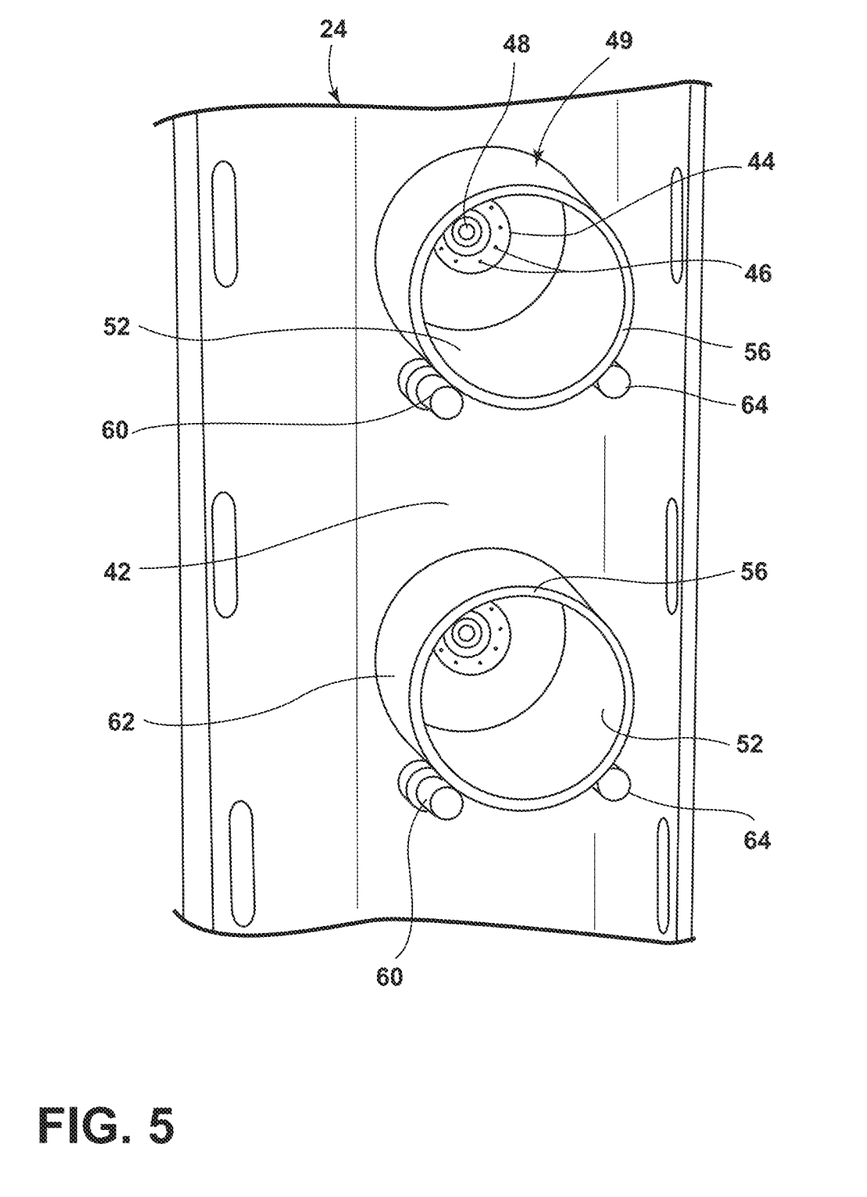
FIG. 5 is a front perspective view of the burner support and burner assemblies shown in FIG. 3.
Figure 6:
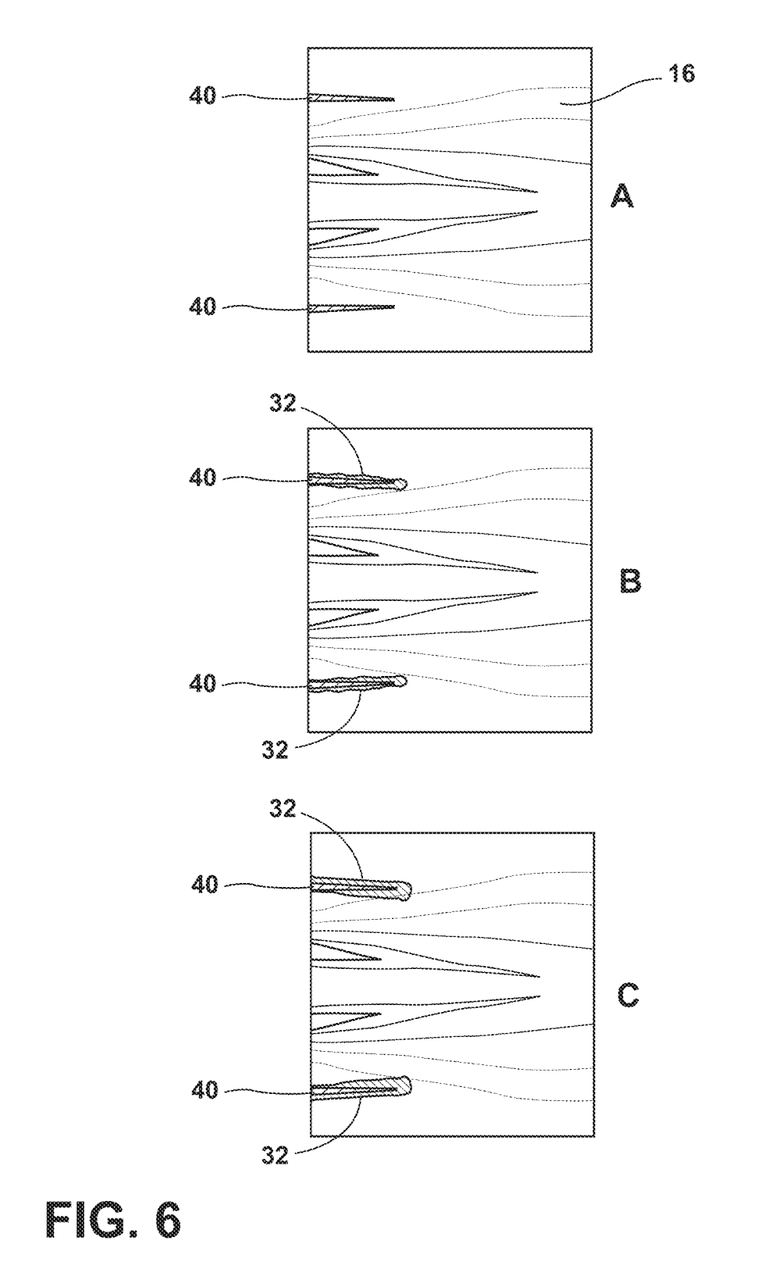
FIG. 6A is a cross sectional view of a burner shield according to the present disclosure for use on a soot depositing burner assembly upon a startup of operation of the burner assembly.
FIG. 6B is a cross sectional view of the burner shield shown in FIG. 6A after operation of the burner assembly for 20 minutes.
FIG. 6C is a cross sectional view of the burner shield shown in FIG. 6A after operation of the burner assembly for 30 minutes.

In the embodiment depicted in FIGS. 3-5, the burner support 24 includes a first surface 42, from which the plurality of soot depositing burner assemblies 12 extend. Each burner assembly 12 includes a burner face 44 disposed on the first surface 42. The burner face 44 includes openings 46 through which gases (not shown) such as oxygen, methane, nitrogen, or other gases are supplied. The gases that are flammable that are supplied to the burner are ignited to form the soot depositing flame 16, and the openings 46 are configured to generate the flame 16, to extend generally perpendicularly from the first surface 42 and the burner support 24. At least one precursor for the production of the soot material 14, possible precursors including without limitation silicon tetrachloride or octymethylcyclotetrasiloxane, are supplied via a carrier gas through a fume tube 48 to the flame 16 generated by the burner assembly 12, and the flame 16 causes the precursors to react, forming the soot material 14. The soot material 14 is deposited on the rotating bait rod 18 during operation of the burner assembly 12. The soot material 14 formed can be a pure silica soot, or optionally includes dopants, including without limitation elements such as F, B, Ge, Er, Ti, Al, Li, K, Rb, Cs, Cl, Br, Na, Nd, Bi, Sb, Yb, or combinations thereof, to alter the optical qualities of the optical fiber or a portion of the optical fiber ultimately formed from the preform 20. Any other precursors or other materials useful in forming the soot material 14 can be supplied through the fume tube 48.

Also as shown in the embodiment of the present disclosure as shown in FIGS. 3-5, each burner assembly 12 includes the burner shield 40 disposed about the flame 16 generated by the burner assembly 12. Each of the burner shields 40 as depicted in this embodiment includes a generally cylindrical first wall 49, which is disposed radially outwardly from the soot deposition burner face 44 and which is spaced from the first surface 42 of the burner support 24, allowing an air gap 50 for air to enter between the first surface 42 of the burner support 24 and the burner shield 40. Each burner shield 40 is composed of a material which is able to withstand the temperatures reached by the burner assembly 12 during operation, including extended operation. One preferred material for the burner shield 40 is a glass material, for example, a silica glass.

The generally cylindrical first wall 49 includes an interior surface 52 which extends from a base end 54 to a shield face 56 of the burner shield 40. In the embodiment shown in FIGS. 3-5, the shield face 56 has a surface area that is less than the surface area of the base end 54. The first wall 49 also has a first wall thickness adjacent to the base end 54 and a second wall thickness adjacent to the shield face 56, and the second wall thickness is less than the first wall thickness. As shown in the embodiment depicted in FIG. 4, the burner shield 40 preferably includes a tapered angle α along an exterior surface 62 thereof, where the first wall 49 narrows from the first thickness to the second thickness. In preferred embodiments, the wall is tapered at an angle α between about 30° and about 60° from the shield face 56. In these embodiments, an inner diameter $ID_1$ of the burner shield 40 is the same when measured adjacent the base end 54 or adjacent the shield face 56, but the outer diameter adjacent the shield face 56 is smaller than the outer diameter adjacent the base end 54. In alternate embodiments, the exterior surface 62 may include a step-wise reduction in wall thickness. In the embodiment depicted in FIGS. 3-6, the inner diameter $ID_1$ of the burner shield 40 is about 50.8 mm in diameter, with the first wall thickness being about 2.0 mm adjacent the base end 54, and the second wall thickness being about 0.1 mm adjacent the shield face 56. Preferably, the first wall thickness is between about 1.0 mm and about 3.0 mm at the base end 54 to provide sufficient rigidity and structural strength of the burner shield 40, with the second wall thickness being less than 1.0 mm at the shield face 56.

More preferably, the second wall thickness is less than about 0.5 mm, and even more preferably the second wall thickness is less than about 0.1 mm.

In another preferred embodiment of the burner shield 40, the inner diameter $ID_1$ of the burner shield 40 at a distance of about 1 cm from the base end 54 is at least 1 cm. In another preferred embodiment, the inner diameter $ID_1$ of the burner shield 40 at a distance of about 1 cm from the base end 54 is at least 3 cm. In yet another preferred embodiment, the inner diameter $ID_1$ of the burner shield 40 at a distance of about 1 cm from the base end 54 is between 1 cm and 10 cm. Additionally, the first wall 49 of the burner shield 40 has a length $L_1$ from the base end 54 to the shield face 56. In one preferred embodiment, the length $L_1$ of the first wall 49 is at least 3 cm. In another preferred embodiment, the length $L_1$ of the first wall 49 is at least 5 cm. In yet another preferred embodiment, the length $L_1$ of the first wall 49 is between 3 cm and 20 cm. The inner diameter $ID_1$ of the burner shield 40 and length $L_1$ of the first wall 49 of the burner shield 40 are preferably sized in accordance with the size and geometry of the burner face 44, the distance to the bait rod 18, and the geometry of the housing 22 and the burner support 24.

As shown in the embodiment depicted in FIGS. 3-5, at least one shield support post 60 is disposed in a supporting relationship to the burner shield 40, adjacent to an exterior surface 62 thereof. In the embodiment depicted in FIGS. 3-5, each shield support post 60 is a shaft which extends generally perpendicularly from the first surface 42 of the burner support 24 and terminates in an outer face 64 generally opposite the first surface 42 of the burner support 24. The outer face 64 is preferably recessed from the shield face 56. In one preferred embodiment, the outer face 64 of the at least one shield support post 60 is disposed adjacent the exterior surface 62 at a point that is less than 80% of the length $L_1$ from the base end 54. In another preferred embodiment, the outer face 64 of the shield support post 60 is disposed adjacent the exterior surface 62 at a point that is less than 50% of the length $L_1$ from the base end 54. In another preferred embodiment, the outer face 64 of the shield support post 60 is tapered, as shown in the embodiment depicted in FIG. 4. In alternate embodiments, the first wall 49 of the burner shield 40 could be joined or affixed directly to the first surface 42, preferably with openings 46 provided therein to allow air to enter between the first wall 49 and the burner shield 40, as described above.

As shown in the embodiment depicted in FIGS. 6A-6C, the presently disclosed burner shields 40 do incur some buildup of soot material 14 during operation of the burner assembly 12, but the buildup is less than what is encountered using the previously used burner shields 30, and the soot material 14 does not tend to aggregate on the shield face 56, where it is more susceptible to detachment and fouling of the preform 20. FIG. 6A is a cross sectional view of the burner shield 40 when the burner assembly 12 operation begins. FIGS. 6B and 6C illustrate the soot buildup on the burner shield 40 at 20 minutes and 30 minutes of operation of the burner assembly 12, respectively. The reduction in soot buildup (and detachment) results in higher quality preforms 20, with fewer defects. The increase in preform 20 quality is especially useful, because even small defects in the preform 20 can negatively impact the optical fiber yield as the fiber is drawn from the preform 20. The decrease in defects also makes the soot deposition process described herein suitable for use in producing optical fiber cores, where the burner shields 40 can increase soot deposition efficiency and aid in refractive index profile control.

Figure 7:
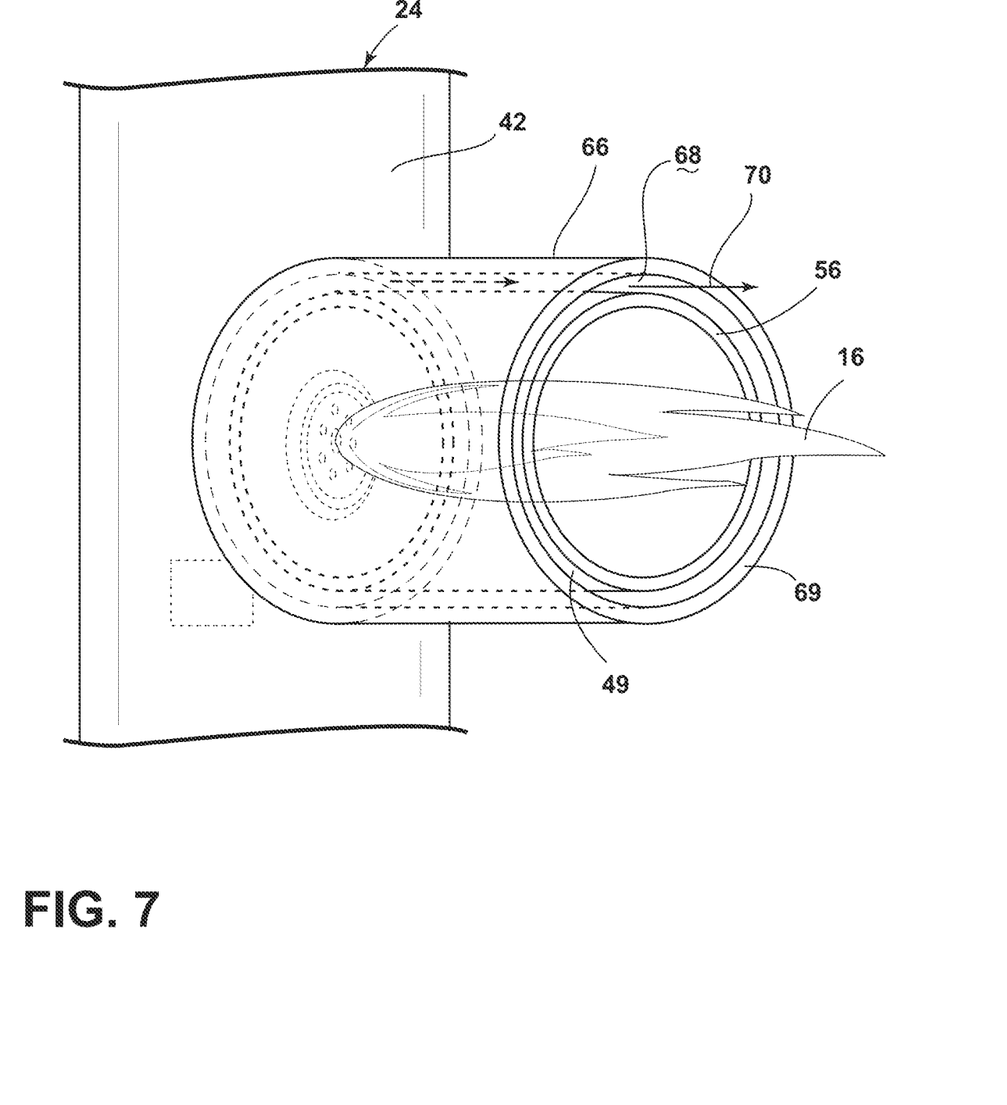
FIG. 7 is a front perspective view of another embodiment of a burner support and a burner assembly according to the present disclosure.
Figure 8:
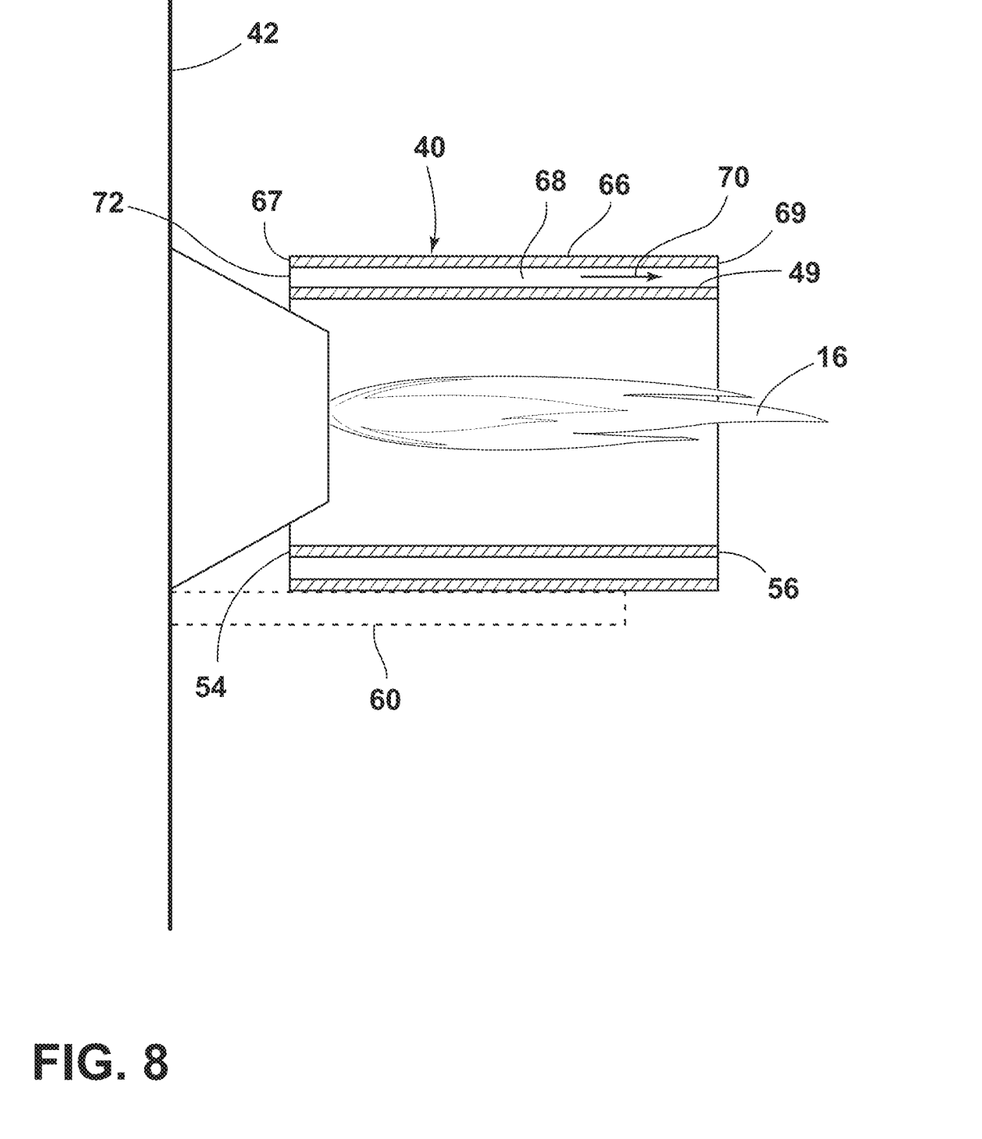
FIG. 8 is an enlarged side elevation view of the burner assembly shown in FIG. 7, with the burner shield shown in cross section.

In another embodiment, as depicted in FIGS. 7 and 8, the burner shield 40 further includes a generally cylindrical second wall 66, extending generally perpendicularly from the first surface 42, with a second wall base end 67 adjacent the first surface 42 and a second wall shield face 69 at the opposite end. The second wall 66 is disposed generally outwardly from the first wall 49, defining an annular space 68 between the first wall 49 and the second wall 66. Gas flow 70 is permitted to flow through the annular space 68, from the base ends 54, 67 toward the shield faces 56, 69. The gas flow 70 reduces the opportunity for soot material 14 to settle on the shield face 56, and therefore reduces the opportunity for lobes 32 to form which can detach and foul the preform 20. It is contemplated that the first wall 49 and the second wall 66 could be formed by a single piece, with an annular space 68 defined between them around at least a portion of the circumference, and this is included within the descriptive terms of the first wall 49 and the second wall 66 used herein.

In one embodiment, an air inlet 72 is provided in the second wall 66, or between the first wall 49 and the second wall 66, and the first wall 49 and second wall 66 are relatively positioned with respect to one another to passively promote the gas flow 70 in the direction from the base ends 54, 67 toward the shield faces 56, 69. In another embodiment, the distance of the shield face 56 of the first wall 49 from the first surface 42 is different than the distance of the shield face 69 of the second wall 66 from the first surface 42. This promotes the gas flow 70 through the annular space 68, thus lowering soot deposition on the shield faces 56, 69. In one preferred embodiment, the shield face 56 and the shield face 69 have a difference in distance from the first surface 42 of greater than 1 mm. In another preferred embodiment, the shield face 56 and the shield face 69 have a difference in distance from the first surface of between 1 mm and 10 mm. Additionally, in embodiments including the second cylindrical wall 66, the first cylindrical 49 wall is preferably tapered to a thinner wall thickness at the shield face 56, as described herein.

According to one aspect of the present disclosure, a burner shield for a soot deposition burner includes a generally cylindrical first wall 49 which is disposed radially outwardly from the soot deposition burner. The first wall 49 includes an interior surface 52 which extends from a base end 54 to a shield face 56. The first wall 49 has a first thickness adjacent to the base end 54 and a second thickness adjacent to the shield face 56, and the second thickness is less than the first thickness.

Another aspect of the present disclosure includes a soot deposition burner assembly 12, having at least one soot deposition burner including a burner face 44 on a first surface 42 of a burner support 24. The soot deposition burner produces a flame 16 which extends generally perpendicularly to the burner face 44. A burner shield includes a first wall 49 extending generally perpendicularly from the first surface 42 surrounding the burner face 44. The burner shield has a base end 54 with a first surface 42 area facing toward the first surface 42 of the burner support 24 and a shield face 56 with a second surface area facing away from the first surface 42 of the burner support 24. The second surface area is smaller than the first surface 42 area.

Another aspect of the present disclosure includes a burner shield for a soot deposition burner disposed on a first surface 42 of a burner support 24, where the burner shield includes a generally cylindrical first wall 49 disposed radially outwardly from the soot deposition burner, and generally cylindrical second wall 66 disposed radially outwardly from the first wall 49. An annular space 68 is defined between the first wall 49 and the second wall 66, and a gas flow 70 is permitted to flow through the annular space 68 in a direction generally perpendicular to and outward from the first surface 42 of the burner support 24.

Yet another aspect of the present disclosure includes a method of making a preform 20 for an optical fiber, including the steps of operating a burner assembly 12 to produce a flame 16, wherein the burner assembly 12 includes a burner face 44 disposed on a first surface 42 of a burner support 24, and wherein the flame 16 extends generally perpendicularly from the first surface 42. The flame 16 is guided with a burner shield, wherein the burner shield includes a generally cylindrical first wall 49 which is disposed radially outwardly from the burner face 44, and the first wall 49 includes an interior surface 52 surrounding the flame 16 and extends from a base end 54 to a shield face 56. The first wall 49 has a first thickness adjacent to the base end 54 and a second thickness adjacent to the shield face 56, and the second thickness is less than the first thickness. Precursors for the production of a soot material 14 are supplied to the flame 16. The precursors are reacted in the flame 16 to form the soot material 14. The formed soot material 14 is deposited onto a rotating bait rod 18 positioned generally perpendicularly to the flame 16.

It will be apparent to those skilled in the art that various modifications and variations can be made without departing from the spirit or scope of the claims.

What is claimed is:

1. A method of making a preform for an optical fiber, including the steps of:
    operating a burner assembly to produce a flame, wherein the burner assembly includes a burner face disposed on a first surface of a burner support and wherein the flame extends generally perpendicularly from the first surface;
    guiding the flame with a burner shield, wherein the burner shield includes a generally cylindrical first wall which is disposed radially outwardly from the burner face, wherein the generally cylindrical first wall includes an interior surface surrounding the flame and extends from a base end to a shield face, wherein the generally cylindrical first wall has a first thickness adjacent to the base end and a second thickness adjacent to the shield face, and wherein the second thickness is less than the first thickness;
    wherein the burner shield is at least partially supported by a shield support post having an outer face, and wherein the outer face of the shield support post is recessed from the shield face;
    supplying precursors for the production of a soot material to the flame;
    reacting the precursors in the flame to form the soot material; and
    depositing the formed soot material onto a rotating bait rod, wherein the rotating bait rod is positioned generally perpendicularly to the flame.

2. The method of making a preform of claim 1, wherein the second thickness is less than 1.0 mm.

3. The method of making a preform of claim 1, wherein the second thickness is less than 0.5 mm.

4. The method of making a preform of claim 1, further comprising the step of:
    directing an air flow over an exterior surface of the generally cylindrical first wall, wherein the exterior surface is generally opposite the interior surface, from the base end toward the shield face.

5. The method of making a preform of claim 4, wherein the air flow is directed through an annular space defined between the exterior surface of the generally cylindrical first wall and a generally cylindrical second wall which is disposed radially outwardly from the generally cylindrical first wall.

6. The method of making a preform of claim 5, wherein a the generally cylindrical first wall and the second wall are relatively positioned with respect to one another to passively promote the gas flow from the base end toward the shield face.

7. The method of making a preform of claim 1, further comprising the step of:
    forming a generally cylindrical burner shield using a glass material;
    sharpening one end of the glass burner shield, resulting in one tapered end; and
    securing the burner shield directly or indirectly to the first surface of the burner support to guide the flame.

8. The method of making a preform of claim 1 wherein the burner shield has a length, $L_1$, and wherein the support post is less than 80% of the length $L_1$.

9. The method of making a preform of claim 1 wherein the burner shield has a length, $L_1$, and wherein the support post is less than 50% of the length $L_1$.

10. The method of making a preform of claim 1 wherein the burner shield has a tapered angle, alpha, along an exterior surface.

11. The method of making a preform of claim 10 wherein the tapered angle alpha is between 30° and 60° from the shield face.

12. The method of making a preform of claim 1 wherein the burner shield is spaced with an air gap from the first surface.

13. The method of making a preform of claim 1 wherein the support post is tapered, with its longest portion adjacent the exterior surface of the burner shield.

14. The method of making a preform of claim 1 wherein the burner shield has an inner diameter $D_1$, and $D_1$ is between 1 cm and 10 cm.

15. The method of making a preform of claim 1 wherein the burner shield has a length $L_1$, and $L_1$ is between 3 cm and 20 cm.

16. The method of making a preform of claim 1 wherein the burner shield has a tapered shield face.

* * * * *

UNITED STATES PATENT AND TRADEMARK OFFICE
CERTIFICATE OF CORRECTION

PATENT NO. : 9,540,272 B2
APPLICATION NO. : 14/284772
DATED : January 10, 2017
INVENTOR(S) : Dana Craig Bookbinder et al.

It is certified that error appears in the above-identified patent and that said Letters Patent is hereby corrected as shown below:

In the Claims

In Column 8, Line 18, in Claim 6, delete "a the" and insert -- the --.

Signed and Sealed this
Twenty-fifth Day of October, 2022

Katherine Kelly Vidal
*Director of the United States Patent and Trademark Office*